US012612205B2

(12) United States Patent
Lin et al.

(10) Patent No.: US 12,612,205 B2
(45) Date of Patent: Apr. 28, 2026

(54) DOUBLE-ROW CONVEYOR BELT FEEDING APPARATUS AND PACKAGING BOX TRANSPORTATION DEVICE AND METHOD FOR USING SAME

(71) Applicants: Luzhou Laojiao Co., Ltd., Luzhou (CN); Luzhou Laojiao Niangjiu Co., Ltd., Luzhou (CN); Nanjing F&P Packaging Machinery Co., Ltd., Nanjing (CN)

(72) Inventors: Feng Lin, Luzhou (CN); Bingkun Zhao, Luzhou (CN); Junwu Lin, Luzhou (CN); Ziji Lin, Luzhou (CN); Yuandong Wang, Luzhou (CN); Hongtao Li, Luzhou (CN); Yachun Xu, Luzhou (CN)

(73) Assignees: Luzhou Laojiao Co., Ltd (CN); Luzhou Laojiao Niangjiu Co., Ltd. (CN); Nanjing F&P Packaging Machinery Co., Ltd. (CN)

( * ) Notice: Subject to any disclaimer, the term of this patent is extended or adjusted under 35 U.S.C. 154(b) by 100 days.

(21) Appl. No.: 18/811,018

(22) Filed: Aug. 21, 2024

(65) Prior Publication Data

US 2025/0282512 A1 Sep. 11, 2025

(30) Foreign Application Priority Data

Mar. 5, 2024 (CN) .......................... 202410249920.0

(51) Int. Cl.
B65B 43/52 (2006.01)
B65B 57/04 (2006.01)
(Continued)

(52) U.S. Cl.
CPC .............. B65B 43/52 (2013.01); B65B 57/04 (2013.01); B65G 47/71 (2013.01); B65G 47/88 (2013.01)

(58) Field of Classification Search
CPC ......... B65B 43/52; B65B 57/04; B65G 47/71; B65G 47/8884; B65G 47/8892
(Continued)

(56) References Cited

U.S. PATENT DOCUMENTS 3,669,283 A * 6/1972 Brown, Jr. ............. B65G 59/02
414/931
4,179,022 A * 12/1979 Grocke ................... B65B 57/20
198/442
(Continued)

FOREIGN PATENT DOCUMENTS

CN 104176332 A 12/2014
CN 204702183 U 10/2015
(Continued)

OTHER PUBLICATIONS

First Office Action dated Jun. 5, 2025 for CN patent application No. 202410249920.0.
(Continued)

*Primary Examiner* — James R Bidwell

(74) *Attorney, Agent, or Firm* — DINSMORE & SHOHL LLP

(57) ABSTRACT

A double-row conveyor belt feeding apparatus includes a charging conveyor belt; a box body limiting baffle configured to block box bodies from entering a first conveyor belt and a second conveyor belt; box body limiting push rods configured to limit and fix a third row of box bodies; and a box body moving push rod configured to transfer a first row of box bodies and a second row of box bodies and to be driven to push the first row of box bodies to move by
(Continued)

pushing the second row of box bodies, so as to make the first row of box bodies move onto the first conveyor belt. After the first row of box bodies move onto the first conveyor belt, the box body moving push rods are configured to be driven to cause the second row of box bodies to move backwards onto the second conveyor belt.

10 Claims, 3 Drawing Sheets

(51) Int. Cl.
  *B65G 47/71*          (2006.01)
  *B65G 47/88*          (2006.01)
(58) Field of Classification Search
  USPC ........................................ 198/433, 443, 445
  See application file for complete search history.

(56)                References Cited

U.S. PATENT DOCUMENTS 4,413,720 A * 11/1983 Pfleger ................. B65G 47/681
                                                      198/433
5,341,914 A * 8/1994 DeMars ............... B65G 47/082
                                                      198/418.6
8,746,436 B2 * 6/2014 Yohe ...................... B65G 47/53
                                                      198/460.1
2021/0130025 A1 * 5/2021 Schaafsma ............... B26D 1/01

FOREIGN PATENT DOCUMENTS

| | | |
|---|---|---|
| CN | 210366011 U | 4/2020 |
| CN | 111959888 A | 11/2020 |
| CN | 218840883 U | 4/2023 |
| CN | 117429684 A | 1/2024 |
| JP | H04121319 A | 4/1992 |
| JP | 2008044707 A | 2/2008 |

OTHER PUBLICATIONS

Second Office Action dated Jul. 2, 2025 for CN patent application No. 202410249920.0.

Decision of Refusal dated Aug. 18, 2025 for CN patent application No. 202410249920.0.

* cited by examiner

DOUBLE-ROW CONVEYOR BELT FEEDING APPARATUS AND PACKAGING BOX TRANSPORTATION DEVICE AND METHOD FOR USING SAME

CROSS REFERENCE TO RELATED APPLICATION

This application claims priority to Chinese Application 2024102499200, filed Mar. 5, 2024, which is hereby incorporated by reference in its entirety.

FIELD OF THE INVENTION

The present invention relates to the field of object transportation technologies, and specifically to a double-row conveyor belt feeding apparatus and a packaging box transportation device and a method for using same.

BACKGROUND

In the production work in the fields such as material transportation, especially the field of alcohol production packaging, cartons for packaging products need to be opened and transferred onto a conveyor belt. In the prior art, opened cartons are usually transferred onto a conveyor belt through suction cups. To improve production efficiency and ensure production and supply, two conveyor belts usually need to be used to simultaneously provide cartons for a next processing procedure. However, in the prior art, if the same batch of cartons need to be transferred onto two conveyor belts, two sets of suction cups with robotic arms are required to complete the foregoing work. The foregoing robotic arms and suction cups require high purchase and maintenance costs, and also need to occupy a large space. This leads to the problem of high construction and maintenance costs of factories.

To resolve the foregoing technical problems, a person skilled in the art urgently needs a novel double-row conveyor belt feeding apparatus, so that opened cartons can be stably and reliably transferred onto two conveyor belts.

SUMMARY OF THE INVENTION

Therefore, a technical problem to be resolved by the present invention is to resolve the problem that a feeding apparatus in the prior art cannot stably and reliably transfer opened cartons onto two conveyor belts. For this, the present invention provides a double-row conveyor belt feeding apparatus, including:

a charging conveyor belt, corresponding to a first conveyor belt and a second conveyor belt, and configured to convey box bodies toward the first conveyor belt and the second conveyor belt;

a box body limiting baffle, located at an exit position of the charging conveyor belt, and configured to be driven to move to block the box bodies from entering the first conveyor belt and the second conveyor belt;

box body limiting push rods, disposed on two lateral sides of the charging conveyor belt, where the box body limiting push rods correspond to a third row of box bodies that are on the charging conveyor belt and are close to the box body limiting baffle; and box body moving push rods, disposed on the two lateral sides of the charging conveyor belt, where the box body moving push rods correspond to a second row of box bodies that are on the charging conveyor belt and are close to the box body limiting baffle, where the box body moving push rods are configured to be driven to push a first row of box bodies to move by pushing the second row of box bodies, so as to make the first row of box bodies move onto the first conveyor belt; and after the first row of box bodies move onto the first conveyor belt, the box body moving push rods are configured to be driven to cause the second row of box bodies to move backwards onto the second conveyor belt, so as to make the second row of box bodies move onto the second conveyor belt.

The first row of box bodies are a row of box bodies closest to the second conveyor belt on the charging conveyor belt. The second row of box bodies are the second row of box bodies close to the second conveyor belt adjacent to the first row of box bodies on the charging conveyor belt. The third row of box bodies are the third row of box bodies close to the second conveyor belt adjacent to the second row of box bodies on the charging conveyor belt.

Optionally, the box body moving push rods are disposed on a sliding track, and the sliding track is disposed in a length direction of the charging conveyor belt.

Optionally, the box body moving push rods are slidably disposed on the sliding track through an L-shaped support; one support arm of the L-shaped support is slidably disposed on the sliding track, and the other support arm of the L-shaped support extends toward the box bodies; and the L-shaped support has an extension position where the L-shaped support protrudes from the sliding track and reaches a position above the first conveyor belt and the second conveyor belt.

Optionally, the box body moving push rods are located at positions below the box body limiting push rods and close to bottoms of the box bodies.

Optionally, the box body limiting baffle is disposed along a transverse direction of the charging conveyor belt, and is configured to be driven to ascend or descend in a vertical direction for blocking the box bodies.

Optionally, the double-row conveyor belt feeding apparatus further includes:

a baffle driving mechanism, including a driving push rod and guide telescopic rods, where the driving push rod is connected to a bottom of the box body limiting baffle for driving the box body limiting baffle to ascend or descend; and the guide telescopic rods are disposed on two sides of the driving push rod for guiding the box body limiting baffle to ascend or descend.

Optionally, the double-row conveyor belt feeding apparatus further includes:

a detection contact lever, disposed on a movement path of the charging conveyor belt, where a plurality of detection contact levers are provided and correspond to the box bodies distributed along a transverse direction of the charging conveyor belt in one-to-one correspondence; and the detection contact levers are configured to detect whether a box body on the charging conveyor belt is missing.

Optionally, the double-row conveyor belt feeding apparatus further includes:

a first position sensor, configured to detect whether the first row of box bodies reach the first conveyor belt;

a second position sensor, configured to detect whether the second row of box bodies reach the second conveyor belt; and a third position sensor, disposed at the exit position of the charging conveyor belt, and configured to detect whether the box bodies reach a position of the box body limiting baffle.

A packaging box transportation device includes:

a double-row conveyor belt feeding apparatus; and a first conveyor belt and a second conveyor belt.

A method for using a packaging box transportation device, which uses a packaging box transportation device, and includes the following steps:

Step S1: driving a plurality of box bodies on the charging conveyor belt to move to the exit position of the charging conveyor belt, and blocking the box bodies by using the box body limiting baffle;

Step S2: driving the box body limiting push rods to protrude to fix the third row of box bodies;

Step S3: driving the box body moving push rods to protrude to grip and fix the second row of box bodies, and resetting the box body limiting baffle to stop blocking the box bodies;

Step S4: pushing the first row of box bodies onto the first conveyor belt by using the box body moving push rods to push the second row of box bodies, and next, causing the second row of box bodies to move backwards onto the second conveyor belt by using the box body moving push rods; and Step S5: after it is detected that box bodies are stacked on both the first conveyor belt and the second conveyor belt, starting the first conveyor belt and the second conveyor belt to transport the box bodies to a next working position, and simultaneously, retracting the box body limiting push rods to allow the third row of box bodies to move forward into a first-row position close to the box body limiting baffle.

The technical solution in the present invention has the following advantages:

1. The double-row conveyor belt feeding apparatus provided in the present invention includes:

a charging conveyor belt, corresponding to a first conveyor belt and a second conveyor belt, and configured to convey box bodies toward the first conveyor belt and the second conveyor belt;

a box body limiting baffle, located at an exit position of the charging conveyor belt, and configured to be driven to move to block the box bodies from entering the first conveyor belt and the second conveyor belt;

box body limiting push rods, disposed on two lateral sides of the charging conveyor belt, where the box body limiting push rods correspond to a third row of box bodies that are on the charging conveyor belt and are close to the box body limiting baffle; and box body moving push rods, disposed on the two lateral sides of the charging conveyor belt, where the box body moving push rods correspond to a second row of box bodies that are on the charging conveyor belt and are close to the box body limiting baffle, where the box body moving push rods are configured to be driven to push a first row of box bodies to move by pushing the second row of box bodies, so as to make the first row of box bodies move onto the first conveyor belt; and after the first row of box bodies move onto the first conveyor belt, the box body moving push rods are configured to be driven to cause the second row of box bodies to move backwards onto the second conveyor belt, so as to make the second row of box bodies move onto the second conveyor belt.

In the present invention, the foregoing three rows of box bodies at positions close to the first conveyor belt and the second conveyor belt are limited and blocked by using the foregoing box body limiting baffle. Next, the box body limiting push rods then limit and fix the third row of box bodies, to keep the row of box bodies from moving in a movement process of other box bodies adjacent to same.

After the foregoing work is completed, the box body moving push rods grip and fix the second row of box bodies, and push the first row of box bodies onto the first conveyor belt through the second row of box bodies. Next, the box body moving push rods then cause the second row of box bodies to move backwards onto the second conveyor belt. Through the mutual cooperation of the charging conveyor belt, the box body limiting baffle, the box body limiting push rods, and the box body moving push rods, the same batch of cartons can be stably and reliably transferred onto two conveyor belts, respectively, in a simple and steady manner, and also a large factory space is not occupied. The foregoing structure works stably and reliably, requires low construction and maintenance costs, and can practically and effectively resolve the problem of how to transfer the same batch of cartons onto two conveyor belts. In addition, the foregoing structure can continuously transfer cartons onto two conveyor belts, thereby improving the production efficiency of workshops and ensuring production and supply.

2. In the double-row conveyor belt feeding apparatus provided in the present invention, the box body moving push rods are disposed on the sliding track, and the foregoing sliding track is disposed in the length direction of the charging conveyor belt. The foregoing sliding track can stably and reliably guide the box body moving push rods to slide longitudinally in the length direction of the charging conveyor belt, to respectively transfer the first row of box bodies and the second row of box bodies onto the first conveyor belt and the second conveyor belt.

3. In the double-row conveyor belt feeding apparatus provided in the present invention, the box body moving push rods are slidably disposed on the sliding track through the L-shaped support. One support arm of the L-shaped support is slidably disposed on the sliding track, and the other support arm of the L-shaped support extends toward the box bodies. The L-shaped support can enable the box body moving push rods to effectively extend toward the second conveyor belt at an end portion of the sliding track, to ensure that the box body moving push rods extend to a position of the second conveyor belt, thereby pushing the first row of box bodies onto the first conveyor belt and gripping and transferring the second row of box bodies onto the second conveyor belt.

4. In the double-row conveyor belt feeding apparatus provided in the present invention, the box body moving push rods are located at the positions below the box body limiting push rods and close to the bottoms of the box bodies. In the present invention, the box body moving push rods are disposed below the box body limiting push rods in the vertical direction, so that the box body moving push rods can grip a box body from the bottom of the box body, and stably and reliably transfer the box body to a required position.

5. In the double-row conveyor belt feeding apparatus provided in the present invention, the box body limiting baffle is disposed along a transverse direction of the charging conveyor belt, and is configured to be driven to ascend or descend in the vertical direction for blocking the box bodies. The box body limiting baffle is disposed as a baffle telescopic in the vertical direction. The baffle can stably and reliably block box bodies from moving onto the first conveyor belt or the second conveyor belt. In addition, the baffle can further implement position sorting of box bodies on the charging conveyor belt, making it convenient for the box body limiting push rods and the box body moving push rods to position, fix, and move box bodies.

6. The double-row conveyor belt feeding apparatus provided in the present invention further includes the detection contact lever, disposed on the movement path of the charging conveyor belt. The plurality of detection contact levers are provided and correspond to the box bodies distributed along a transverse direction of the charging conveyor belt in one-to-one correspondence. The detection contact levers are configured to detect whether a box body on the charging conveyor belt is missing.

In the present invention, the detection contact levers can effectively detect whether a box body on the charging conveyor belt is missing. In addition, the detection contact levers can further complete counting work.

7. The double-row conveyor belt feeding apparatus provided in the present invention further includes: the first position sensor, configured to detect whether the first row of box bodies reach the first conveyor belt; the second position sensor, configured to detect whether the second row of box bodies reach the second conveyor belt; and the third position sensor, disposed at the exit position of the charging conveyor belt, and configured to detect whether the box bodies reach the position of the box body limiting baffle.

In the present invention, through the foregoing first position sensor, second position sensor, and third position sensor, position information of box bodies can be effectively detected, so that driving parts of the double-row conveyor belt feeding apparatus cooperate and act to implement transportation of the box bodies.

8. The packaging box transportation device provided in the present invention includes: the double-row conveyor belt feeding apparatus; and the first conveyor belt and the second conveyor belt. The packaging box transportation device in the present invention includes the foregoing double-row conveyor belt feeding apparatus, and therefore has all the advantages of the double-row conveyor belt feeding apparatus.

9. The method for using a packaging box transportation device provided in the present invention uses the foregoing packaging box transportation device. In the present invention, the foregoing three rows of box bodies are limited and blocked by using the box body limiting baffle. In addition, the box body limiting push rods limit and fix the third row of box bodies, and then the box body moving push rods push the first row of box bodies onto the first conveyor belt, and transfer second row of box bodies onto the second conveyor belt. The foregoing structure works stably and reliably, requires low construction and maintenance costs, occupies a small space, and can practically and effectively resolve the problem of how to transfer the same batch of cartons onto two conveyor belts.

BRIEF DESCRIPTION OF THE DRAWINGS

To describe the technical solutions in specific embodiments of the present invention or the prior art more clearly, the following briefly introduces the accompanying drawings required for describing the specific embodiments or the prior art. Apparently, the accompanying drawings in the following description show some embodiments of the present invention, and a person of ordinary skill in the art may still derive other drawings from these accompanying drawings without creative efforts.

REFERENCE NUMERALS

1—charging conveyor belt; 2—first conveyor belt; 3—second conveyor belt; 4—box body; 5—box body limiting push rod; 6—box body moving push rod; 7—box body limiting baffle; 8—L—shaped support; 9—sliding track; 10—baffle driving mechanism; 11—driving push rod; 12—guide telescopic rod; and 13—detection contact lever.

DETAILED DESCRIPTION OF THE INVENTION

The following clearly and completely describes the technical solutions in the present invention with reference to the accompanying drawings. Apparently, the embodiments described below are some embodiments of the present invention rather than all the embodiments. All other embodiments obtained by persons of ordinary skill in the art based on the embodiments of the present invention without creative efforts fall within the protection scope of the present invention.

In the description of the present invention, it needs to be noted that orientation or location relationships indicated by terms "center", "up", "down", "left", "right", "vertical", "horizontal", "inside", and "outside" are based on orientation or location relationships shown in the accompanying drawings, and are only used to facilitate description of the present invention and simplify description, but are not used to indicate or imply that the apparatuses or elements must have specific orientations or are constructed and operated by using specific orientations, and therefore, cannot be understood as a limitation to the present invention. In addition, the terms "first", "second", and "third" are used only for description, but are not intended to indicate or imply relative importance.

Embodiment 1

Figure 1:
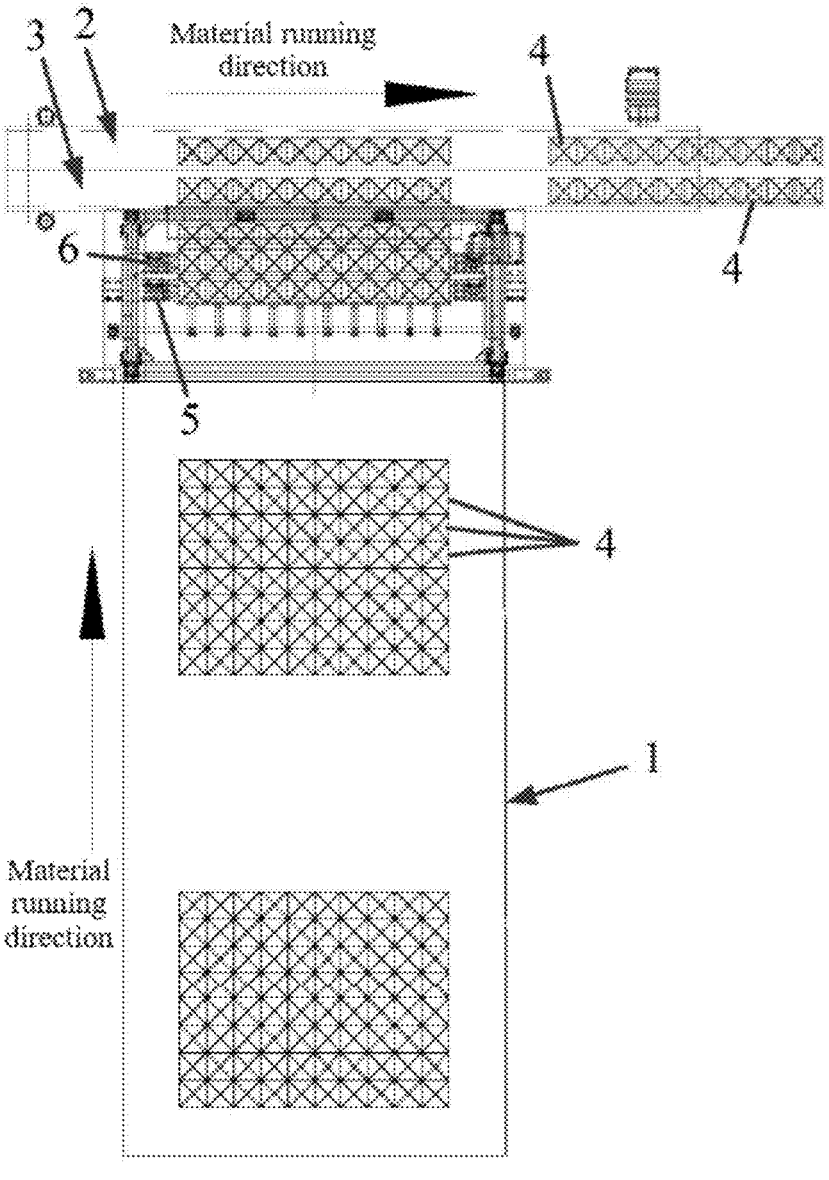
FIG. 1 is a schematic diagram of a relative position of a charging conveyor belt and a first conveyor belt and a second conveyor belt according to the present invention.

FIG. 1 is a schematic diagram of a relative position of a charging conveyor belt and a first conveyor belt and a second conveyor belt according to an embodiment of the present invention.

Figure 2:
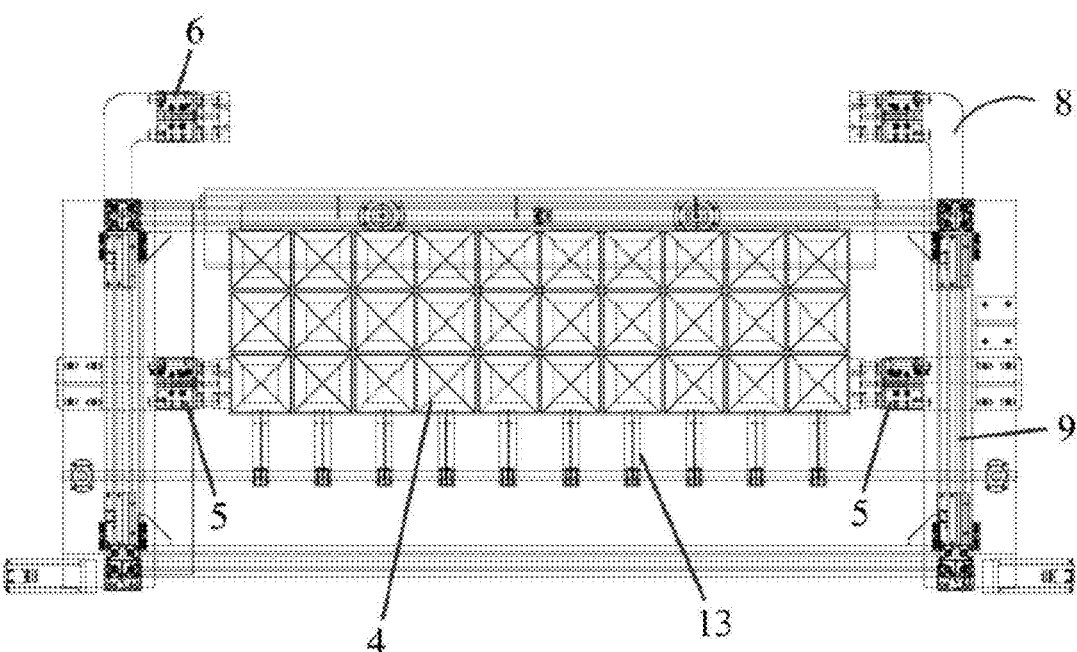
FIG. 2 is a top view of a double-row conveyor belt feeding apparatus according to the present invention.
Figure 3:
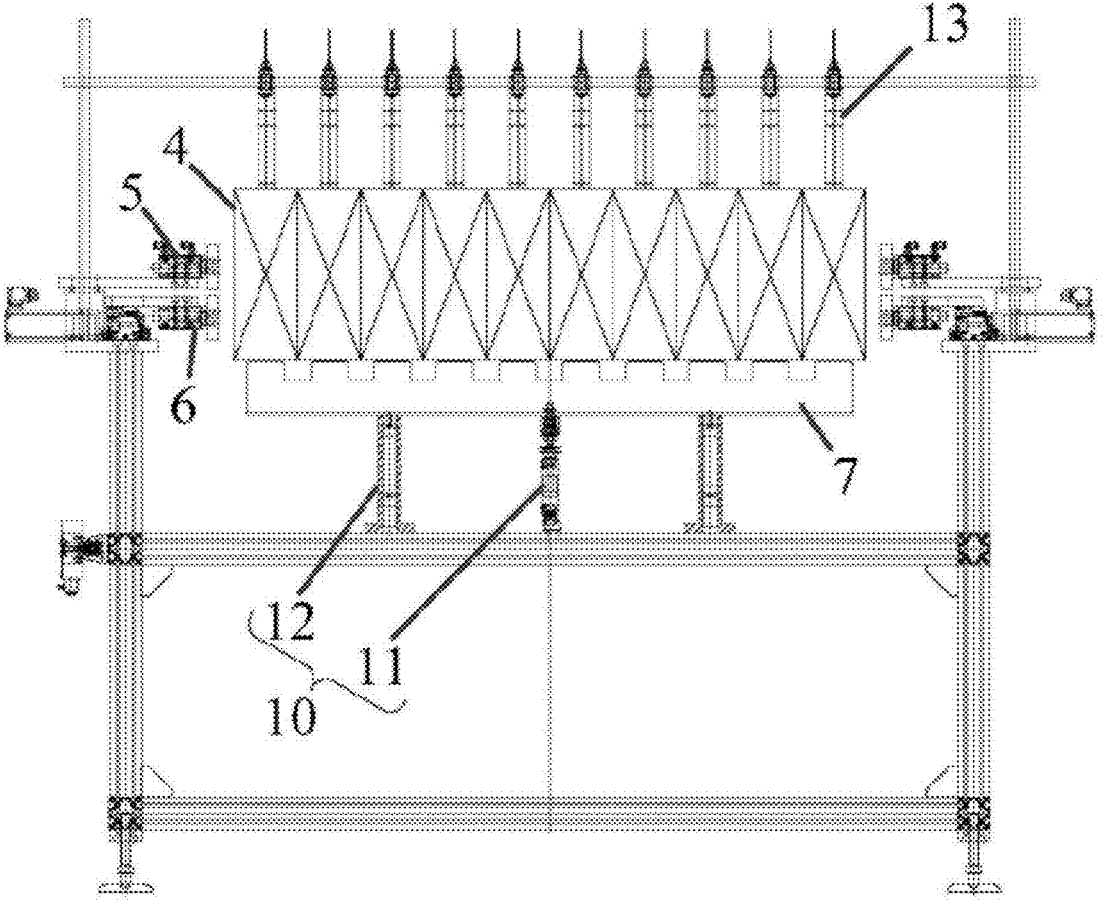
FIG. 3 is a front view of a double-row conveyor belt feeding apparatus according to the present invention.
Figure 4:
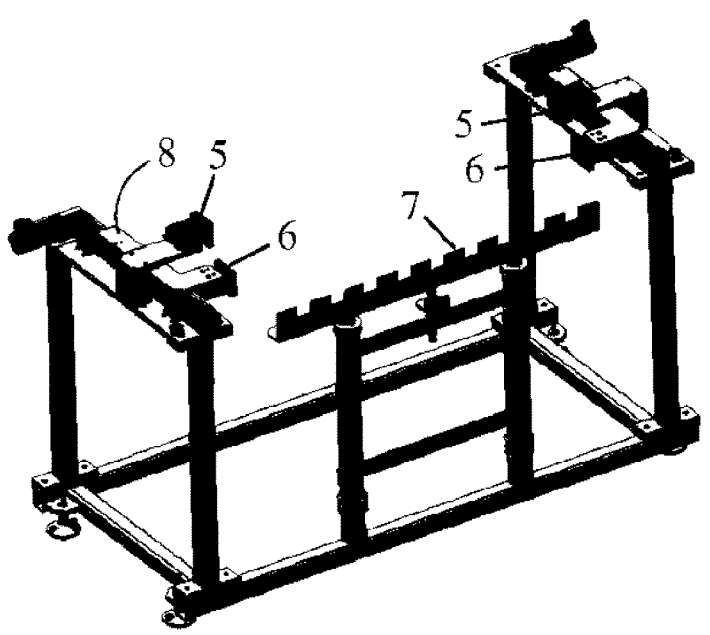
FIG. 4 is a three-dimensional schematic structural diagram of a double-row conveyor belt feeding apparatus according to the present invention.
Figure 5:
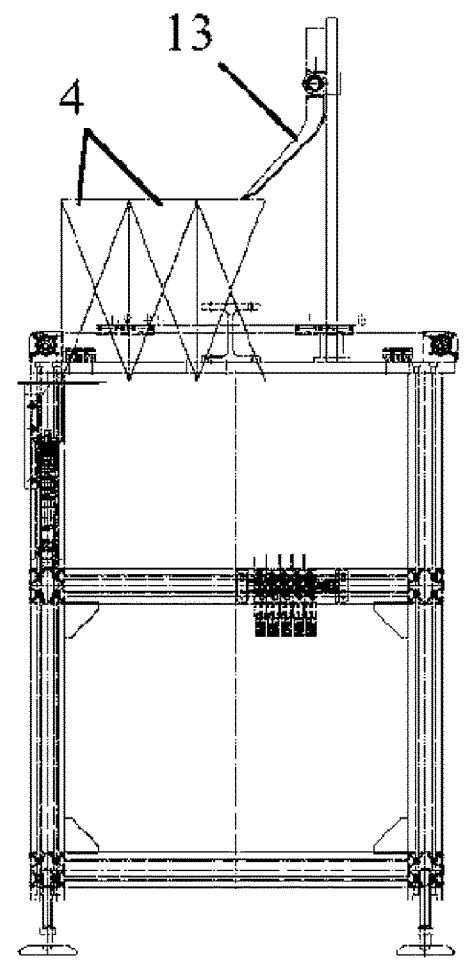
FIG. 5 is a schematic diagram of a relative position of a detection contact lever and a box body according to the present invention.

A double-row conveyor belt feeding apparatus includes: a charging conveyor belt 1, corresponding to a first conveyor belt 2 and a second conveyor belt 3, and configured to convey box bodies 4 toward the first conveyor belt 2 and the second conveyor belt 3;

a box body limiting baffle 7, where as shown in FIG. 4, the box body limiting baffle 7 is a pneumatic driving member and is located at an exit position of the charging conveyor belt 1, and the box body limiting baffle 7 is disposed of the charging conveyor belt 1 and is configured to be driven to ascend or descend in a vertical direction for blocking the box bodies 4 from entering the first conveyor belt 2 and the second conveyor belt 3;

box body limiting push rods 5, where as shown in FIG. 2 and FIG. 3, the box body limiting push rods 5 are pneumatic driving members and are disposed on two lateral sides of the charging conveyor belt 1, and the box body limiting push rods 5 correspond to a third row of box bodies 4 that are on the charging conveyor belt 1 and are close to the box body limiting baffle 7;

box body moving push rods 6, where as shown in FIG. 2 and FIG. 3, the box body moving push rods 6 are pneumatic driving members and are disposed on the two lateral sides of the charging conveyor belt 1, the box body moving push rods 6 correspond to a second row of box bodies 4 that are on the charging conveyor belt 1 and are close to the box body limiting baffle 7, to stably and reliably transfer opened cartons onto two conveyor belts, the box body moving push rods 6 are configured to be driven to push a first row of box bodies 4 to move by pushing the second row of box bodies 4, so as to make the first row of box bodies 4 move onto the first conveyor belt 2, and after the first row of box bodies 4 move onto the first conveyor belt 2, the box body moving push rods 6 are configured to be driven to cause the second row of box bodies 4 to move backwards onto the second conveyor belt 3, so as to make the second row of box bodies 4 move onto the second conveyor belt 3;

a baffle driving mechanism 10, including a driving push rod 11 and guide telescopic rods 12, where the driving push rod 11 is connected to a bottom of the box body limiting baffle 7 for driving the box body limiting baffle 7 in a pneumatic manner to ascend or descend; and the guide telescopic rods 12 are disposed on two sides of the driving push rod 11 for guiding the box body limiting baffle 7 to ascend or descend; and a detection contact lever 13, where as shown in FIG. 5, the detection contact lever 13 is disposed on a movement path of the charging conveyor belt 1, a plurality of detection contact levers 13 are provided and correspond to the box bodies 4 distributed along a transverse direction of the charging conveyor belt 1 in one-to-one correspondence, and the detection contact levers 13 are configured to detect whether a box body 4 on the charging conveyor belt 1 is missing.

In this embodiment, FIG. 2 is a top view of a double-row conveyor belt feeding apparatus, and FIG. 4 is a three-dimensional schematic structural diagram of a double-row conveyor belt feeding apparatus. The box body moving push rods 6 are stably and reliably guided to slide longitudinally in a length direction of the charging conveyor belt 1. In this embodiment, a sliding track 9 is disposed in the length direction of the charging conveyor belt 1. The box body moving push rods 6 are drivingly and slidably disposed on the sliding track 9, to respectively transfer the first row of box bodies 4 and the second row of box bodies 4 onto the first conveyor belt 2 and the second conveyor belt 3.

In addition, conveyance directions of the first conveyor belt 2 and the second conveyor belt 3 and a conveyance direction of the charging conveyor belt 1 are perpendicular to each other. Therefore, the sliding track 9 cannot extend to positions of the first conveyor belt 2 and the second conveyor belt 3. To resolve the foregoing problem, an L-shaped support 8 is designed in this application. The box body moving push rods 6 are slidably disposed on the sliding track 9 through the L-shaped support 8; one support arm of the L-shaped support 8 is slidably disposed on the sliding track 9, and the other support arm of the L-shaped support 8 extends toward the box bodies 4; and the L-shaped support 8 has an extension position where the L-shaped support 8 protrudes from the sliding track 9 and reaches a position above the first conveyor belt 2 and the second conveyor belt 3. The L-shaped support 8 can enable the box body moving push rods 6 to effectively extend toward the second conveyor belt 3 at an end portion of the sliding track 9, to ensure that the box body moving push rods 6 extend to a position of the second conveyor belt 3, thereby pushing the first row of box bodies 4 onto the first conveyor belt 2 and gripping and transferring the second row of box bodies 4 onto the second conveyor belt 3.

In this embodiment, to ensure that the box body moving push rods 6 can stably and reliably transfer the box bodies 4 and transfer the box bodies 4 to required positions, the box body moving push rods 6 are located at positions below the box body limiting push rods 5 and close to bottoms of the box bodies 4.

In this embodiment, to effectively detect position information of the box bodies 4 to make driving parts of the double-row conveyor belt feeding apparatus cooperate and act to implement the transportation of the box bodies 4. In this embodiment, the double-row conveyor belt feeding apparatus further includes: a first position sensor, configured to detect whether the first row of box bodies 4 reach the first conveyor belt 2; a second position sensor, configured to detect whether the second row of box bodies 4 reach the second conveyor belt 3; and a third position sensor, disposed at the exit position of the charging conveyor belt 1, and configured to detect whether the box bodies 4 reach the position of the box body limiting baffle 7.

Certainly, the specific structure of the box body limiting baffle 7 and the structure of the baffle driving mechanism 10 for driving the box body limiting baffle 7 are not specifically limited in this embodiment. In other embodiments, the box body limiting baffle 7 may be a baffle protruding from the two sides of the charging conveyor belt 1. Alternatively, the baffle driving mechanism 10 may be a hydraulic driving mechanism or an electric driving mechanism.

Certainly, a specific structure for determining a miss and counting the box bodies 4 is not specifically limited. In other embodiments, a photosensor may detect whether a box body 4 on the charging conveyor belt 1 is missing and simultaneously complete counting work.

Certainly, relative positions of the box body moving push rods 6 and the box body limiting push rods 5 are not specifically limited in this embodiment. In other embodiments, as required, the box body moving push rods 6 may be located at positions above the box body limiting push rods 5 and close to the middle of the box bodies 4.

Embodiment 2

A packaging box transportation device according to the present invention includes: a double-row conveyor belt feeding apparatus; and a first conveyor belt 2 and a second conveyor belt 3.

A double-row conveyor belt feeding apparatus includes:

a charging conveyor belt 1, corresponding to a first conveyor belt 2 and a second conveyor belt 3, and configured to convey box bodies 4 toward the first conveyor belt 2 and the second conveyor belt 3;

a box body limiting baffle 7, where as shown in FIG. 4, the box body limiting baffle 7 is a pneumatic driving member and is located at an exit position of the charging conveyor belt 1, and the box body limiting baffle 7 is disposed along a transverse direction of the charging conveyor belt 1 and is configured to be driven to ascend or descend in a vertical direction for blocking the box bodies 4 from entering the first conveyor belt 2 and the second conveyor belt 3;

box body limiting push rods 5, where as shown in FIG. 2 and FIG. 3, the box body limiting push rods 5 are pneumatic driving members and are disposed on two lateral sides of the charging conveyor belt 1, and the box body limiting push rods 5 correspond to a third row of box bodies 4 that are on the charging conveyor belt 1 and are close to the box body limiting baffle 7;

box body moving push rods 6, where as shown in FIG. 2 and FIG. 3, the box body moving push rods 6 are pneumatic driving members and are disposed on the two lateral sides of the charging conveyor belt 1, the box body moving push rods 6 correspond to a second row of box bodies 4 that are on the charging conveyor belt 1 and are close to the box body limiting baffle 7, to stably and reliably transfer opened cartons onto two conveyor belts, the box body moving push rods 6 are configured to be driven to push a first row of box bodies 4 to move by pushing the second row of box bodies 4, so as to make the first row of box bodies 4 move onto the first conveyor belt 2, and after the first row of box bodies 4 move onto the first conveyor belt 2, the box body moving push rods 6 are configured to be driven to cause the second row of box bodies 4 to move backwards onto the second conveyor belt 3, so as to make the second row of box bodies 4 move onto the second conveyor belt 3;

a baffle driving mechanism 10, including a driving push rod 11 and guide telescopic rods 12, where the driving push rod 11 is connected to a bottom of the box body limiting baffle 7 for driving the box body limiting baffle 7 in a pneumatic manner to ascend or descend; and the guide telescopic rods 12 are disposed on two sides of the driving push rod 11 for guiding the box body limiting baffle 7 to ascend or descend; and a detection contact lever 13, where as shown in FIG. 5, the detection contact lever 13 is disposed on a movement path of the charging conveyor belt 1, a plurality of detection contact levers 13 are provided and correspond to the box bodies 4 distributed along a transverse direction of the charging conveyor belt 1 in one-to-one correspondence, and the detection contact levers 13 are configured to detect whether a box body 4 on the charging conveyor belt 1 is missing.

A method for using a packaging box transportation device specifically includes the following steps:

Step S1: driving a plurality of box bodies 4 on the charging conveyor belt 1 to move to the exit position of the charging conveyor belt 1, and blocking the box bodies 4 by using the box body limiting baffle 7;

Step S2: driving the box body limiting push rods 5 to protrude to fix the third row of box bodies 4;

Step S3: driving the box body moving push rods 6 to protrude to grip and fix the second row of box bodies 4, and resetting the box body limiting baffle 7 to stop blocking the box bodies 4;

Step S4: pushing the first row of box bodies 4 onto the first conveyor belt 2 by using the box body moving push rods 6 to push the second row of box bodies 4, and next, causing the second row of box bodies 4 to move backwards onto the second conveyor belt 3 by using the box body moving push rods 6; and Step S5: after it is detected that box bodies 4 are stacked on both the first conveyor belt 2 and the second conveyor belt 3, starting the first conveyor belt 2 and the second conveyor belt 3 to transport the box bodies 4 to a next working position, and simultaneously, retracting the box body limiting push rods 5 to allow the third row of box bodies 4 to move forward into a first-row position close to the box body limiting baffle 7.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

The invention claimed is:

1. A double-row conveyor belt feeding apparatus, comprising:

a charging conveyor belt, corresponding to a first conveyor belt and a second conveyor belt, and configured to convey box bodies toward the first conveyor belt and the second conveyor belt;

a box body limiting baffle, located at an exit position of the charging conveyor belt, and configured to be driven to move to block the box bodies from entering the first conveyor belt and the second conveyor belt;

box body limiting push rods, disposed on two lateral sides of the charging conveyor belt, wherein the box body limiting push rods correspond to a third row of box bodies that are on the charging conveyor belt and are close to the box body limiting baffle; and box body moving push rods, disposed on the two lateral sides of the charging conveyor belt, wherein the box body moving push rods correspond to a second row of box bodies that are on the charging conveyor belt and are close to the box body limiting baffle, wherein the box body moving push rods are configured to be driven to push a first row of box bodies to move by pushing the second row of box bodies, so as to make the first row of box bodies move onto the first conveyor belt; and after the first row of box bodies move onto the first conveyor belt, the box body moving push rods are configured to be driven to cause the second row of box bodies to move backwards onto the second conveyor belt, so as to make the second row of box bodies move onto the second conveyor belt.

2. The double-row conveyor belt feeding apparatus according to claim 1, wherein the box body moving push rods are disposed on a sliding track, and the sliding track is disposed in a length direction of the charging conveyor belt.

3. The double-row conveyor belt feeding apparatus according to claim 2, wherein the box body moving push rods are slidably disposed on the sliding track through an L-shaped support; one support arm of the L-shaped support is slidably disposed on the sliding track, and the other support arm of the L-shaped support extends toward the box bodies; and the L-shaped support has an extension position where the L-shaped support protrudes from the sliding track and reaches a position above the first conveyor belt and the second conveyor belt.

4. The double-row conveyor belt feeding apparatus according to claim 1, wherein the box body moving push rods are located at positions below the box body limiting push rods and close to bottoms of the box bodies.

5. The double-row conveyor belt feeding apparatus according to claim 1, wherein the box body limiting baffle is disposed along a transverse direction of the charging conveyor belt, and is configured to be driven to ascend or descend in a vertical direction for blocking the box bodies.

6. The double-row conveyor belt feeding apparatus according to claim 5, further comprising:

a baffle driving mechanism, comprising a driving push rod and guide telescopic rods, wherein the driving push rod is connected to a bottom of the box body limiting baffle for driving the box body limiting baffle to ascend or descend; and the guide telescopic rods are disposed on two sides of the driving push rod for guiding the box body limiting baffle to ascend or descend.

7. The double-row conveyor belt feeding apparatus according to claim 1, further comprising:

a detection contact lever, disposed on a movement path of the charging conveyor belt, wherein a plurality of detection contact levers are provided and correspond to the box bodies distributed along a transverse direction of the charging conveyor belt in one-to-one correspondence; and the detection contact levers are configured to detect whether a box body on the charging conveyor belt is missing.

8. The double-row conveyor belt feeding apparatus according to claim 1, further comprising:

a first position sensor, disposed at an initial end of the first conveyor belt, and configured to detect whether the first row of box bodies reach the first conveyor belt;

a second position sensor, disposed at an initial end of the second conveyor belt, and configured to detect whether the second row of box bodies reach the second conveyor belt; and a third position sensor, disposed at the exit position of the charging conveyor belt, and configured to detect whether the box bodies reach a position of the box body limiting baffle.

9. A packaging box transportation device, comprising:

the double-row conveyor belt feeding apparatus according to claim 1; and the first conveyor belt and the second conveyor belt.

10. A method for using a packaging box transportation device, which uses the packaging box transportation device according to claim 9, and comprises the following steps:

Step S1: driving a plurality of box bodies on the charging conveyor belt to move to the exit position of the charging conveyor belt, and blocking the box bodies by using the box body limiting baffle;

Step S2: driving the box body limiting push rods to protrude to fix the third row of box bodies;

Step S3: driving the box body moving push rods to protrude to grip and fix the second row of box bodies, and resetting the box body limiting baffle to stop blocking the box bodies;

Step S4: pushing the first row of box bodies onto the first conveyor belt by using the box body moving push rods to push the second row of box bodies, and next, causing the second row of box bodies to move backwards onto the second conveyor belt by using the box body moving push rods; and Step S5: after it is detected that box bodies are stacked on both the first conveyor belt and the second conveyor belt, starting the first conveyor belt and the second conveyor belt to transport the box bodies to a next working position, and simultaneously, retracting the box body limiting push rods to allow the third row of box bodies to move forward into a first-row position close to the box body limiting baffle.

* * * * *